Patented July 23, 1946

2,404,416

UNITED STATES PATENT OFFICE 2,404,416

PROCESS FOR PREPARING 4-SUBSTITUTED THIAZOLES

William P. Utermohlen, Jr., Kingsport, Tenn., assignor to Eastman Kodak Company, Rochester, N. Y., a corporation of New Jersey No Drawing. Application June 9, 1945, Serial No. 598,637

12 Claims. (Cl. 260—302)

This invention relates to a process for preparing 4-substituted thiazoles.

It is known that 2-amino-4-methylthiazole can be prepared by condensing thiourea with chloroacetone. In United States Patent 2,242,237, dated May 20, 1941, the preparation of 2-aminothiazole from thiourea and $\alpha,\beta$-dichloroethyl acetate or $\alpha,\beta$-dibromoethyl acetate is described. This patent also discloses the formation of 2-amino-4-methylthiazole from thiourea and $\alpha,\beta$-dichloropropyl acetate.

I have now found that thiourea and $\alpha,\beta$-dichloroisopropyl acetate condense to give 2-amino-4-methylthiazole, a wholly unexpected end-product, in view of the prior reported condensation with $\alpha,\beta$-dichloropropyl acetate. If the $\alpha,\beta$-dichloropropyl acetate gives the 4-methyl derivative, it would be expected that the $\alpha,\beta$-dichloroisopropyl acetate would give the 5-methyl derivatives. Not only have I been able to prepare 2-amino-4-methylthiazole, but also other 4-substituted thiazoles using either $\alpha,\beta$-dichloro or $\alpha,\beta$-dibromo monocarboxylic esters with other thioamides containing the —CS—NH$_2$ group.

It is, accordingly, an object of my invention to provide a new process for preparing 4-substituted thiazoles. Other objects will become apparent hereinafter.

In accordance with my invention, I prepare 4-substituted thiazoles by condensing a thioamide containing the —CS—NH$_2$ group with an $\alpha,\beta$-dihalogeno monocarboxylic ester of the following general formula:

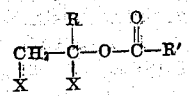

wherein X represents chlorine or bromine and R and R' each represents an alkyl group, an aralkyl group or an aryl group. The condensations are advantageously effected in an aqueous medium. Heat accelerates the condensations. Following the condensation, the reaction mixture is made alkaline with a base which is stronger than the 4-substituted thiazole, in order to free the 4-substituted thiazole from its hydrochloride or hydrobromide. Alkali metal hydroxides, e. g. sodium or potassium hydroxide, are advantageously employed.

From thiourea, 2-amino-4-substituted thiazoles can be prepared, from thioacetamide, 2-methyl-4-substituted thiazoles can be prepared, from thiophenylacetamide, 2-benzyl-4-substituted thiazoles can be prepared, from thiobenzamide, 2-phenyl-4-substituted thiazoles can be prepared, etc. When R represents methyl, a 4-methylthiazole is obtained, when R represents ethyl, a 4-ethylthiazole is obtained, when R represents benzyl, a 4-benzylthiazole is obtained, when R represents phenyl, a 4-phenylthiazole is obtained, etc.

The $\alpha,\beta$-dihalogeno monocarboxylic esters of the above general formula can be prepared by chlorinating or brominating unsaturated esters, such as isopropenyl acetate (2-acetoxypropene-1), 2-acetoxy-hexene-1, 2-acetoxyheptene-1, 2-(chloroacetoxy)-hexene-1, 2-benzoyloxyhexene-1, $\alpha$-acetoxystyrene, 2-(phenylacetoxy)-propene-1, 2-acetoxy-3-phenylpropene-1, etc. Such unsaturated esters in which the acid radical is an acetate radical (i. e. the acetoxy derivatives) can be prepared by condensing an appropriate ketone with ketene, in the presence of sulfuric acid. See Gwynn and Degering, Journal of the American Chemical Society 64, 2216 (1942). All the unsaturated esters can be prepared by adding a mono-carboxylic acid to the appropriate monosubstituted acetylene, in the presence of boron trifluoride. See Hennion and Nieuwland, Journal of the American Chemical Society 56, 1802 (1934).

The following examples will serve to illustrate further the manner of practicing my invention.

*Example 1.—2-amino-4-methylthiazole*

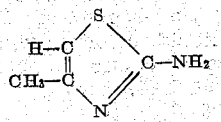

88 g. (0.51 mol.) of $\alpha,\beta$-dichloroisopropyl acetate were added dropwise, with stirring, to a solution of thiourea (46.4 g., 0.61 mol.) in water (100 ml.) heated to 100° C. The reaction mixture was maintained at 100° C., with stirring, for about 3 hours. The resulting solution was cooled to 10 to 15° C. and made strongly alkaline with a concentrated aqueous solution of sodium hydroxide. The upper dark oily layer which separated was separated off, and the aqueous layer was extracted with several portions (about 200 ml. in all) of benzene. The dark oil and the benzene extract were combined and partially dried over solid sodium hydroxide. The sodium hydroxide was filtered off and the filtrate fractionally distilled in vacuo. After the benzene forerun, the 2-amino-4-methylthiazole distilled over as a yellow oil which became a solid upon standing. The 2-amino-4-methylthiazole boiled at 103° C. at 1 mm. of Hg. pressure. The yield was 47 g. (80 per cent) based on the $\alpha,\beta$-dichloroisopropyl acetate. The product melted at 44 to 45° C. and an acetyl derivative prepared therefrom melted at 131 to 132° C. These melting point values agree well with those previously reported for 2-amino-4-methylthiazole and its acetyl derivative (see Org. Syn. 19, 10 (1939) and references therein).

2-amino-5-methylthiazole, on the other hand, melts at 95 to 96.5° C. and its acetyl derivative melts at 224° C. See Chem. Abst. 35, 458 (1941).

Example 2.—2-amino-4-methylthiazole 133 g. (0.51 mol.) of α,β-dibromoisopropyl acetate were condensed with thiourea exactly as in Example 1. The yield of 2-amino-4-methylthiazole was 54.5 g. (93 per cent) based on the α,β-dibromoisopropyl acetate.

Using thioacetamide instead of thiourea, and proceeding exactly as in Example 1, a good yield of 2,4-dimethylthiazole can be obtained; with thiobenzamide, 2-phenyl-4-methylthiazole can be obtained, with thiophenylacetamide, 2-benzyl-4-methylthiazole can be obtained, etc. Using the dichloroester obtained by adding chlorine to α-acetoxystyrene and condensing with thiourea, 2-amino-4-phenylthiazole can be obtained, using the dichloroester obtained by adding chlorine to α-acetoxystyrene and condensing with thioacetamide, 2-methyl-4-phenylthiazole can be obtained, etc.

The following examples illustrate further the preparation of the dichloro and dibromo esters.

Example 3.—α,β-dibromoisopropyl acetate

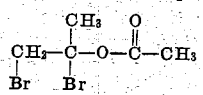

300 g. (3 mol.) of isopropenyl acetate were stirred and cooled to 0° C. 450 g. (2.8+ mol.) of bromine were directly added, dropwise, maintaining the temperature at 0° C. The bromine was immediately taken up. After addition of the bromine, the reaction mixture was fractionating in vacuo, using a total-condensation, variable-takeoff still. Hydrogen bromide and unchanged isopropenyl acetate were the first fractions to be distilled. The α,β-dibromoisopropyl acetate was next obtained, and a high boiling residue was left behind. The α,β-dibromoisopropyl acetate boiled at 62 to 63.5° C. at 40 mm. of Hg. pressure. It was a mobile liquid, colorless when freshly distilled and was a strong lachrymator. N20/D 1.4714; D 20/20 1.6249. Bromine, calculated 61.5 per cent, found 61.8 per cent.

Example 4.—α,β-dichloroisopropyl acetate

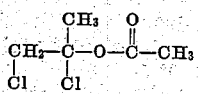

300 g. (3 mol.) of isopropenyl acetate were stirred and cooled to 0° C. Chlorine gas was passed into the cold isopropenyl acetate, maintaining the temperature at 0° C., until somewhat more than 3 moles of chlorine were added. Nitrogen gas was then blown through the reaction mixture to sweep out any remaining free chlorine. The mixture was then fractionated in vacuo as in Example 3. Hydrogen chloride, unreacted isopropenyl acetate, α,β-dichloroisopropyl acetate and a high boiling residue was obtained. The α,β-dichloroisopropyl acetate boiled at 45 to 46° C. at 41 mm. of Hg. pressure. It was a mobile liquid, colorless when freshly distilled and was a lachrymator. N 20/D 1.4344; D 20/20 1.2158. Chlorine, calculated 41.5 per cent, found 40.8 per cent. In this example and in Example 3, the conversions of isopropenyl acetate to the α,β-dihalogenoisopropyl acetate were of the order of 40 to 50 per cent. The yields, based on isopropenyl acetate, were much higher since considerable unreacted isopropenyl acetate was recovered in each case.

In a manner similar to that shown in Examples 3 and 4, 2-acetoxyhexene-1, 2-acetoxyheptene-1, 2-(chloroacetoxy)-hexene-1, 2-benzoyloxyhexene-1, α-acetoxystyrene, 2-(phenylacetoxy)-propene-1, 2-acetoxy-3-phenylpropene-1, etc. can be chlorinated or brominated to give dichloro or dibromo saturated esters.

What I claim as my invention and desire to be secured by Letters Patent of the United States is:

1. A process for preparing a 4-substituted thiazole comprising condensing a thioamide containing the —CS—NH₂ group with a dihalogeno ester of the following general formula:

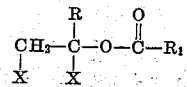

wherein R and R₁ each represents a member selected from the group consisting of alkyl, aralkyl and aryl groups and X represents a halogen selected from the group consisting of chlorine and bromine.

2. A process for preparing a 4-substituted thiazole comprising condensing a thioamide containing the —CS—NH₂ group with α,β-dichloroisopropyl acetate.

3. A process for preparing a 4-substituted thiazole comprising condensing a thioamide containing the —CS—NH₂ group with α,β-dibromoisopropyl acetate.

4. A process for preparing 2-amino-4-methylthiazole comprising condensing thiourea with α,β-dichloroisopropyl acetate.

5. A process for preparing 2-amino-4-methylthiazole comprising condensing thiourea with α,β-dibromoisopropyl acetate.

6. A process for preparing 2,4-dimethylthiazole comprising condensing thioacetamide with α,β-dibromoisopropyl acetate.

7. A process for preparing a 4-substituted thiazole comprising condensing, in an aqueous medium, a thioamide containing the —CS—NH₂ group with a dihalogeno ester of the following general formula:

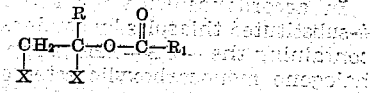

wherein R and R₁ each represents a member selected from the group consisting of alkyl, aralkyl and aryl groups and X represents a halogen selected from the group consisting of chlorine and bromine.

8. A process for preparing a 4-substituted thiazole comprising condensing, in an aqueous medium, a thioamide containing the —CS—NH₂ group with α,β-dichloroisopropyl acetate.

9. A process for preparing a 4-substituted thiazole comprising condensing, in an aqueous medium, a thioamide containing the —CS—NH₂ group with α,β-dibromoisopropyl acetate.

10. A process for preparing 2-amino-4-methylthiazole comprising condensing, in an aqueous medium, thiourea with α,β-dichloroisopropyl acetate.

11. A process for preparing 2-amino-4-methylthiazole comprising condensing, in an aqueous medium, thiourea with α,β-dibromoisopropyl acetate.

12. A process for preparing 2,4-dimethylthiazole comprising condensing, in an aqueous medium, thioacetamide with α,β-dibromoisopropyl acetate.

WILLIAM P. UTERMOHLEN, Jr.